United States Patent
Casale

[11] 3,763,961
[45] Oct. 9, 1973

[54] V-DRIVE TRANSMISSION UTILIZING SPLASH LUBRICATION

[76] Inventor: Ernest Casale, c/o Casale Engineering, 161 8th Ave., City of Industry, Calif. 91746

[22] Filed: June 29, 1972

[21] Appl. No.: 267,638

[52] U.S. Cl. .............................. 184/11 A, 308/187
[51] Int. Cl. .............................................. F16n 7/26
[58] Field of Search ............. 184/11 R, 11 A, 13 R, 184/6.12; 308/187; 74/416, 417

[56] References Cited
UNITED STATES PATENTS

| | | | |
|---|---|---|---|
| 2,240,118 | 4/1941 | Matthews | 184/11 R |
| 2,309,162 | 1/1943 | Buckendale | 184/11 R |
| 2,981,373 | 4/1961 | Ranst | 184/6.12 |
| 2,040,793 | 5/1936 | Peterman | 184/11 R |
| 2,368,963 | 2/1945 | Boden | 184/11 R |

FOREIGN PATENTS OR APPLICATIONS

| | | | |
|---|---|---|---|
| 188,150 | 12/1956 | Germany | 184/11 R |

Primary Examiner—Manuel A. Antonakas
Assistant Examiner—Allan R. Burke
Attorney—Georges A. Maxwell

[57] ABSTRACT

A transmission with a housing defining a chamber with an oil sump, a shaft in the chamber above the sump, bearing means in an opening in the housing through which the shaft projects and rotatably supporting the shaft; the bearing means includes axially aligned inner and outer annular roller bearing assemblies each with primary and secondary ends, inner and outer race rings, and an annular series of rollers between the races on axes diverging axially and radially outwardly toward said secondary end of the assembly; the assemblies are arranged with their secondary ends in opposed relationship with their outer races engaged about the shaft, means to splash oil from the sump throughout the chamber, the inner bearing assembly communicates with the chamber, and lubricating means comprising an oil receiving recess at the bottom of the socket communicating with the outer bearing assembly, an oil inlet duct with an outlet end communicating with the recess and an inlet end communicating with the chamber and an elongate oil outlet duct with an inlet end communicating with the socket between the assemblies and an outlet end communicating with the chamber, the inner races and rollers inducing the flow of oil axially and radially outwardly between the races when rotated whereby oil splashed in the chamber is caused to flow through the inlet duct to the recess, through the assemblies and the outlet duct and back into the chamber.

10 Claims, 8 Drawing Figures

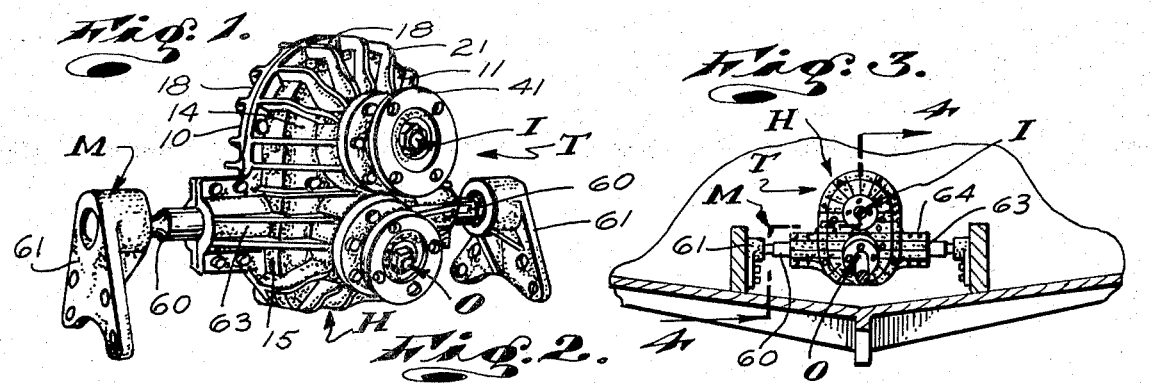
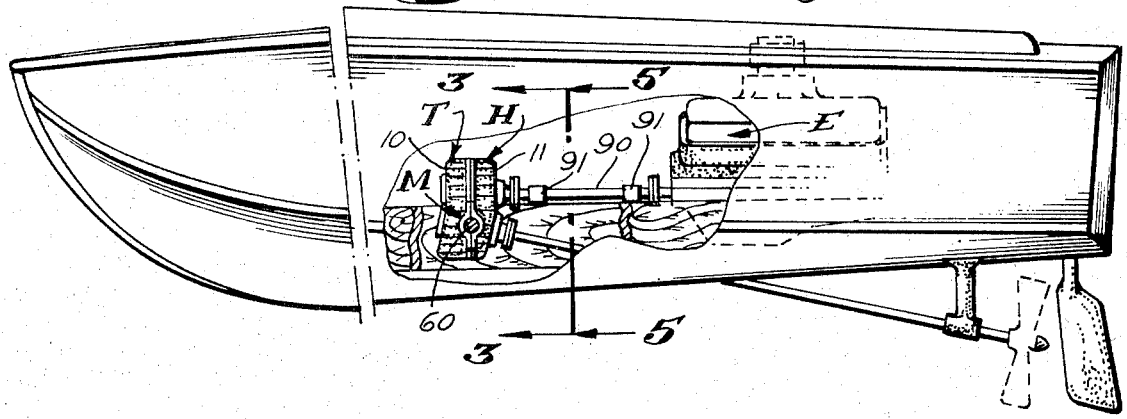
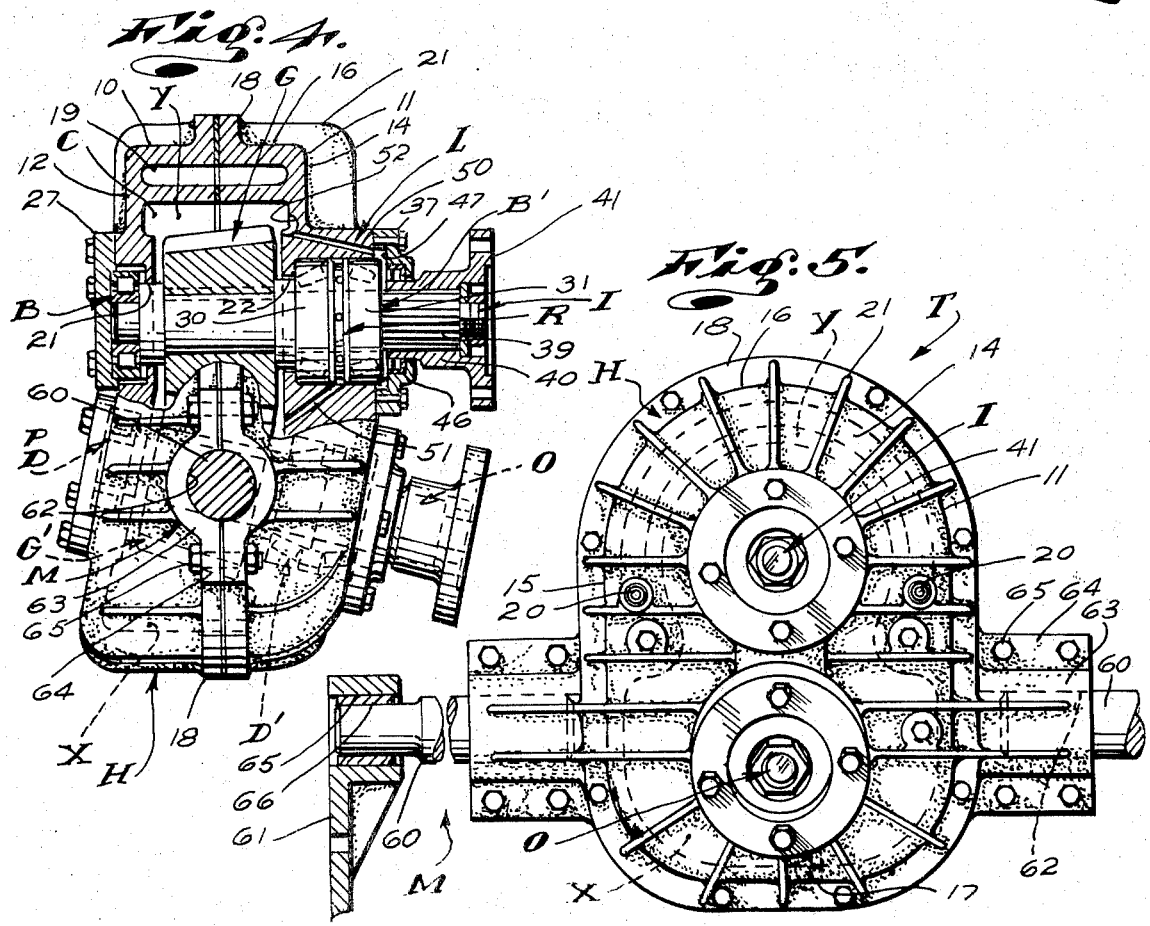

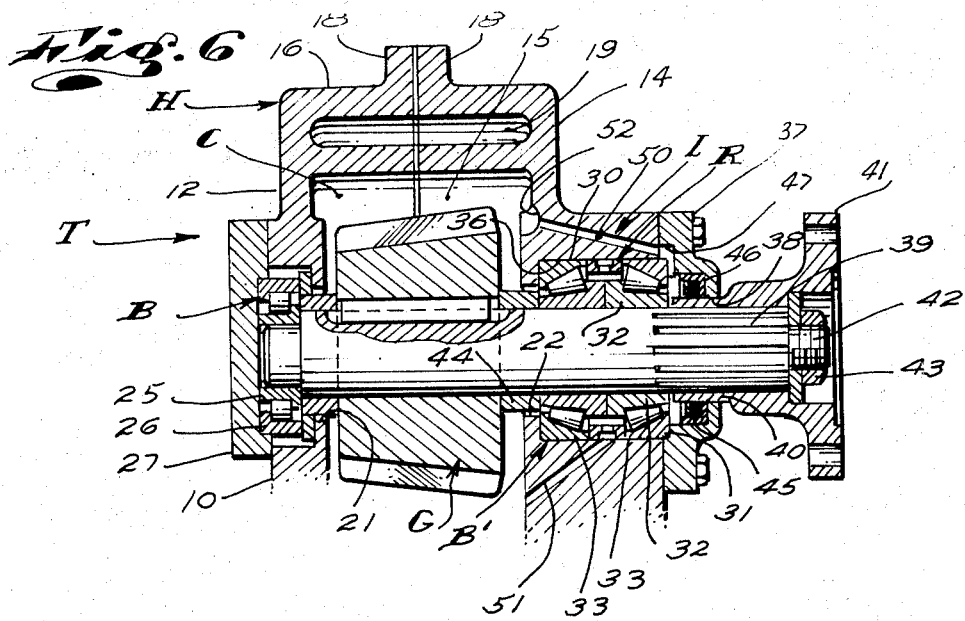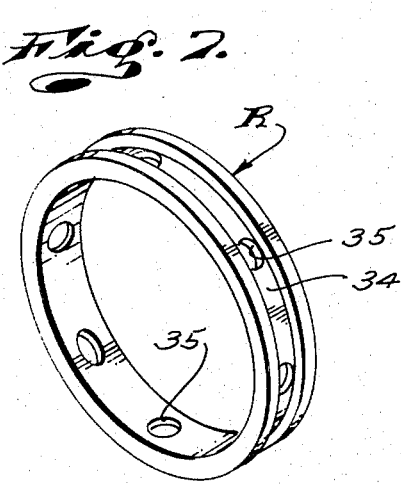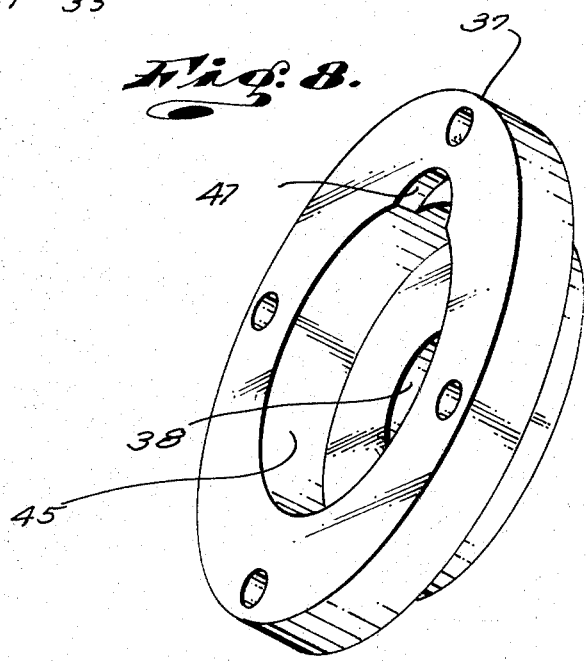

V-DRIVE TRANSMISSION UTILIZING SPLASH LUBRICATION

This invention has to do with a V-drive transmission and is more particularly concerned with a V-drive transmission for marine use and which embodies novel and improved lubricating and mounting means.

Throughout the marine art, transmissions or gear boxes which occur forward of an engine in a vessel or boat and which establish driving connection with and between the forward end of the engine drive shaft and the forward end of a rearwardly and downwardly projecting propeller shaft which extends below the engine, through the bottom of the boat and carries a propeller, have become a standard type and/or form of transmission and are commonly referred to as V-Drives.

V-Drives of the character referred to above are characterized by sectional housings with laterally outwardly disposed mounting means at their opposite sides, which means are commonly in the form of flat apertured flanges adapted to be bolted to flat mounting plates and the like, fixed to the pair of engine stingers commonly provided in power boats to support and carry the engines therein. The housings define a vertically extending chamber with upper and lower, angularly related input and output shafts projecting therethrough and on which meshed input and output gears are carried. The shafts have free rear ends which connect with the drive shafts and propeller shafts with which the transmissions are related.

The input and output shafts are rotatably supported in the housing by anti-friction roller bearings. The lower part of the chamber carries a volume of lubricating oil. The bearings for the lower output shafts are immersed in the oil in the chamber and are therefore well lubricated. The bearings for the upper input shafts are lubricated by oil carried upwardly and cast or splashed by the gears when the transmission is operated.

In the ordinary V-Drive the bearing means on at least one end of each of its shafts is a radial and thrust type roller bearing means utilizing axially tapered and inclined rollers whereby axial and radial thrusts are appropriately received.

In the ordinary V-Drive of the character referred to and so as to adequately receive and handle both the radial and thrust loads imposed on the input and output shafts, radial and thrust load Timkin roller bearings (such as produced by Timkin Roller Bearing Co., of Canton, Ohio) with axially tapered and inclined rollers and races are provided for the input and output shafts. In the preferred bearing means for such transmissions, the rear end portions of the input and output shafts are supported by a pair of Timkin roller bearings arrnaged in end to end, butted relationship and with the axis of their rollers arranged to extend axially and radially outwardly in convergent relationship. The bearing means for the front ends of the shafts are single, radial load roller bearings. The outer races of the bearings are engaged and seated in suitable radially inwardly opening annular cavities or seats established in the walls of the housing sections and the inner races thereof are engaged about their related shafts. The front ends of the shafts terminate within the housing structure or assembly while the rear end portions project rearwardly through openings in the housing structure, which openings are provided with or carry suitable annular seals to prevent the escape and loss of lubricating oil from within the housings.

In practice, the pair of tapered Timkin roller bearings related to the rear portions of the upper input shafts of V-Drive transmissions and which are to be lubricated by oil splashed by the gears, have been notoriously subject to burning out as a result of inadequate lubrication. Attempts to improve the lubrication of the above noted bearing means have consisted of arranging an annular spacer ring between the opposing ends of the related bearings and establishing an oil tunnel in the housing to extend upwardly and axially forwardly from the space between the bearings to the interior of the housing and through which oil, splashed into the upper portion of the housing might flow to lubricate the bearings. Such attempts have met with little or no success.

It has been determined that failure of the upper rear bearing means in such transmissions has occurred in the outer or rearmost bearing of the related bearings and that such failures have been caused by a centrifugal pumping action effected by the noted rear bearings when they are rotated at high speed. That is, due to the forwardly, radially outwardly inclined dispositioning and the forwardly divergent tapered bearing rollers, lubricating oil within the rear bearing is pumped axially forwardly and radially outwardly therefrom when the input shafts rotate and oil flowing axially rearwardly about the shafts and/or conducted between the related pairs of bearings through tunnels or the like, in the housing, will not enter and flow rearwardly between the races and about the rollers of the rear or outermost bearings.

An object and feature of my invention is to provide novel and improved lubricating means for splash lubricated opposed pairs of radial and thrust load roller bearings wherein the centrifugal pumping action afforded by the bearings when they are in operation is utilized to assure an adequate and continual flow of lubricating oil through the bearings.

Another object and feature of my invention is to provide a bearing lubricating means of the character referred to including means to direct and conduct splashed lubricating oil to the opposite ends of a pair of related Timkin roller bearings with rollers on radially outwardly convergent axes, a spacer between the bearings and means communicating with the space between the bearings to conduct lubricating oil pumped into said space by the bearings out of and away from said space whereby the bearings effectively establish and maintain a flow of lubricating oil about and between their rollers and races.

In the course of mounting V-Drive transmissions in boats, the maintaining of proper axial alignment of the input and output shafts with the engine drive shafts and the propeller shafts is most difficult with the flat, flange-type mounting means commonly provided on and for such transmissions.

An object and feature of my invention is to provide a novel mounting means for V-Drive transmissions of the character referred to including laterally, outwardly and oppositely extending cylindrical mounting shafts at opposite sides of the transmission housings, on axes at right angle to and intersecting the axes of the lower output shafts or their related transmissions and mounting brackets rotatably engaging and supporting the outer ends of the mounting shafts and fixed to the engine stingers in the boats with which the transmissions are related.

A further object of my invention is to provide mounting means of the general character referred to above wherein the housing is provided with oppositely and laterally outwardly opening sockets in which the inner ends of the mounting shafts are slidably engaged for axial shifting and adjustment and in which the said shafts are clampedly engaged after the transmission is properly aligned wtih its related propeller shaft.

It is an object and a feature of this invention to provide a mounting means of the character referred to above which is such that once the axes of the mounting shafts are arranged to intersect the axis of a related propeller shaft, the transmission is substantially self-aligning with the propeller shaft and all subsequent adjustments to effect proper alignment of the drive shaft and the input shafts can be effected at and by the means provided to mount the engine, which means commonly includes shims or the like.

The foregoing and other objects and features of my invention will be fully understood and will become apparent from the following detailed description of a typical preferred form and carrying out of my invention throughout which description reference is made to the accompanying drawings in which:

FIG. 1 is a perspective, elevational view of the structure that I provide;

FIG. 2 is a view showing my new structure related to a boat and with an engine and a propeller shaft;

FIG. 3 is a view taken substantially as indicated by line 3—3 on FIG. 2;

FIG. 4 is an enlarged detailed sectional view taken substantially as indicated by line 4—4 on FIG. 3;

FIG. 5 is a view taken substantially as indicated by line 5—5 on FIG. 2 with portions shown in sections to better illustrate the invention;

FIG. 6 is an enlarged detailed sectional view of a portion of the structure shown on FIG. 4 of the drawings;

FIG. 7 is an isometric view of a spacer ring provided by my invention; and

FIG. 8 is an isometric view of a cover plate that I provide.

The V-Drive transmission T provided by the present invention and illustrated in the accompanying drawings includes a housing H defining a chamber C, mounting means M adapted to mount the housing H, an input shaft I rotatably supported in the housing by front and rear bearing means B and B′, an output shaft 0 rotatably supported in the housing by front and rear bearing means D and D′, input and output gears G and G′ carried by the shafts I and O to occur within the chamber and meshed with each other and lubricating means L for the bearing means B.

The housing H is a sectional structure and includes front and rear sections 10 and 11. The housing sections 10 and 11 are preferably opposing shell-like sections having front and rear walls 12 and 14 respectively and each having side walls 15, top and bottom walls 16 and 17 and flat outwardly projecting opposed coupling flanges 18 about the perimeter of the sections defined by said side, top and bottom walls. The sections 10 and 11 are releasably secured together by a plurality of screw fasteners spaced about and engaged through the flanges 18, in accordance with common practice.

In practice, and as illustrated, the sections 10 and 11 of the housing can be formed to establish a coolant chamber 19 about a portion thereof and provided with fluid fittings 20 communicating with the chamber 19 and adapted facilitate the conducting of liquid coolant into, through and out of the chamber 19.

Further, in practice, and as shown, the housing sections can be provided with outwardly projecting heat radial flanges 21 on its exterior surfaces.

The chamber C within and defined by the housing H is greater in vertical extent than in lateral extent and has a lower oil sump portion X in which a volume of lubricating oil is normally held and an upper portion Y into wich the oil in the sump is cast and splashed by the gear G and G′, when the transmission is in operation and as will become apparent in the following.

The input shaft I is an elongate substantially horizontal, cylindrical shaft with front and rear ends and is engaged through axially aligned, upper front and rear openings 21 and 22 in the upper portions of the front and rear walls 12 and 14 of the housing H. The shaft I projects freely through the upper portion Y of the chamber C.

The input gear G is engaged on and with the shaft I in driving engagement therewith and occurs with the upper portion of the chamber C, as clearly shown in the drawings.

The forward end of the shaft I is rotatably supported by bearing means B which is a simple radial roller bearing with an inner race ring 25 suitably engaged within and supporting the forward end of the shaft and an outer ring 26 engaged in a forwardly and radially inwardly opening bearing seat formed on the front wall 10 of the housing about the upper opening therein. The bearing is retained in the seat by a cover plate 27 secured to the front wall of the housing by screw fastening means, which plate overlies and seals the seat and the opening and obscures and shields the bearing B and the shaft.

The bearing B is oriented on the shaft and in the seat by suitably spacer sleeves or washer-like parts, substantially as illustrated in the drawings.

The rear end portion of the shaft I is rotatably supported by the bearings means B′ which means comprises a pair of adjacent, axially aligned radial-thrust, tapered roller bearings; there being a front tapered roller bearing 30 and a rear tapered roller bearing 31. The qualifying term "tapered," as here employed is for the purpose of describing roller bearings wherein the rollers and the races in the race rings are axially and radially inwardly convergent toward primary ends of the bearings and which are, therefor, axially and radially outwardly divergent toward the other or secondary ends of the bearings.

The bearings 30 and 31 are arranged with their secondary ends in opposed relationship and with their primary ends disposed oppositely and axially outwardly of the bearing assembly.

The secondary ends of the inner races 32 of the bearings are in butted engagement with each other while the primary ends of the outer races 33 are in spaced opposed relationship with each other and engage an annular spacer ring R arranged therebetween and which constitutes an element of the bearing assembly.

The ring R has a central radially outwardly opening fluid conducting annular groove 34 and a plurality of circumferentially spaced radial flow ports 35 communicating with the groove and the space between the races 33, radially inward of the ring. (See FIG. 7).

The bearing assembly or means B' is arranged in an annular, radially inwardly and axially rearwardly opening bearing seat 36 established in the rear wall 11 of the housing, concentric with the upper opening 22 therein and with the outer races thereof in stopped, seated engagement therein.

The bearing assembly B' is held in the seat 36 by a retainer plate 37 with a central shaft aperture 38, secured to the rear wall of the housing by screw-fasteners.

The rear portion of the shaft I extends through and is supported by the inner races 32 of the bearings and projects rearwardly therefrom and freely through the aperture 38 in the plate 37.

The rear end portion of the shaft I is splined as at 39 and slidably carries a spacer sleeve-like part 40 having a forward end that engages the inner race of the rear bearing 31 and which projects axially rearwardly and freely through the aperture 38 in the plate 37. The outer rear end of the sleeve part 40 is provided with a radially outwardly projecting aperture coupling flange 41 to facilitate coupling and establishing driving engagement between the shaft I and a related drive shaft, such as the drive shaft of the engine E in the boat in which the V-Drive is used.

The terminal rear end of the shaft I is provided with a threaded pin 42 about and on which a washer and nut assembly 43 is engaged to facilitate retaining the sleeve part on the shaft and effecting axial adjustment thereof.

A spacer ring 44 is engaged on and about the shaft I between the gear G and the forward end of the race 32 of the bearing 30.

The rear cover plate 37 is provided with an annular, radially inwardly and axially forwardly opening seal socket or seat 45 in which an oil seal 46 is engaged. The seal 46 seals between and about the plate 37 and the sleeve port 40 on the shaft I where said part projects through the aperture 38 in the plate.

In addition to the above, the plate 37 is provided with a forwardly opening recess 47 in its forward surface, communicating with and extending upwardly from the forward, uppermost part of the seal socket 45 and open to a space between the seal 46 and the rear bearing 31, which space communicates with the space between the inner and outer races 32 and 33 of said bearing.

The above noted space, the recess 47, the grooved and apertured ring R and the upper rear opening 22 in the rear wall of the housing cooperate with and/or establish elements and/or parts of the lubricating means L that I provide for the bearing means B'.

The lubricating means L, in addition to the foregoing elements and parts further includes an oil inlet tunnel 50 drilled or otherwise formed in the rear wall of the housing and extending upwardly and forwardly from the rear surface of the rear wall, where it communicates with the cavity 47 in the plate 37, to the front surface of the rear wall where it communicates with the upper portion of the housing chamber C, above the shaft I and at or adjacent the uppermost portion of the gear G.

Finally, the means L includes an oil outlet tunnel 51 drilled or otherwise formed in the rear wall of the housing which tunnel is forwardly and downwardly inclined. Tunnel 51 has an upper rear end which opens at the bearing seat 36 and communicates with the groove 34 in the ring R at the bottom or lowermost portion thereof and has a lower forward end which communicates with the housing chamber C, below the shaft I.

With the bearing means B' and lubricating means L set forth above, and when the transmission or V-Drive is in operation, it will be apparent that oil splashed up in the chamber C and onto the inner surface of the rear wall by the gears is free to flow rearwardly through the opening 22 in the rear wall to the forward primary end of the front bearing 30 and is free to flow rearwardly through the tunnel 50, through the cavity 47 into the seal socket and to the rear primary end of the rear bearing 31.

As the bearings 30 and 31 rotate with the shaft, oil delivered to their primary ends is caused to flow or is pumped axially therethrough, between their inner and outer races and about the rollers therein, to their opposing secondary ends and into the space between the outer races 33 and radially inward of the ring R.

The oil thus moved flows through the openings 35 in the ring R, into and about the groove 34 thereof and thence outwardly in the tunnel 51 to be redeposited in the chamber C.

With the structure set forth above, it will be apparent that the bearing means are effectively lubricated and that the lubricating oil is in fact caused to flow and is pumped through the bearings by that centrifugal pumping effect which the bearings afford.

In practice, and as shown in the drawings, the rear wall of the housing can and is preferably provided with a fowardly opening oil catching pocket 52 at the forward end of the tunnel 50.

The front and rear bearing means D and D' related to the output shaft O, with the lower portion of the housing H and the lower sump portion X of the chamber C can be and are preferably similar to the bearing means B and B', except that the bering means D' and its related structure need not be provided with a lubricating means L such as referred to above, since the bearing D' is at or below the oil level in the sump portion X of the chamber C and is completely immersed in oil at all times.

Since detailed illustration and further detailed description or consideration of the bearing means D and D' and the structure directly related thereto would be or consist of a repetition of the above disclosure of the means B and B', I will not burden this disclosure with further description or consideration thereof.

It is believed to be apparent and it is to be understood that the exact details of construction and the exact relationship of parts establishing the means B' and its related lubricating means, disclosed in the drawings and described in the foregoing, is only one typical embodiment of my invention and that in practice, the structure can be varied widely without departing from the spirit of my invention.

In its broadest and most basic sense, the means L of the instant invention consists of utilizing the centrifugal pumping effect found in tapered roller bearings and to provide appropriate fluid handling structure in connection with the bearings whereby said pumping effect can be and is utilized to cause or induce the flow of lubricating oil through the bearings It is to be noted tht the shafts I and O are in a common, vertical, longitudinal plane and that the shaft O is inclined downwardly and rearwardly at an angle of, for example, 12° relative to the horizontal shaft I. The meshed gears G and G' are beveled at, for example, 6°.

To effect the noted angular relationship of the shafts, the upper and lower portions of the housing H are, as illustrated, appropriately angularly related.

The mounting means M that I provide includes a pair of axially aligned trunions 60 projecting laterally from opposite sides of the housing and mounting brackets 61 to cooperatively engage the outer free ends of the trunions 60.

The trunions 60 are simple, elongate, straight cylindrical shafts with inner and outer ends. The housing H is established with laterally outwardly opening cylindrical sockets 62 in which the inner ends of the trunions are engaged. The sockets 62 are established by laterally outwardly projecting protuberances 63 on the front and rear sections of the housing, which protuberances have elongate, opposed, registering semi-cylindrical recesses cooperating to define the sockets and have adjacent flanges 64 through which fasteners 65 are engaged to hold the protuberances together and in snug, clamped engagement with the trunions.

The above structure is such that the trunions can be effectively shifted laterally in the sockets so as to adjust the extent to which they project laterally from the housing.

The mounting brackets 61 can be of any suitable design and are shown as flat vertical plates fixed to laterally inwardly disposed surfaces of engine stingers S, or the like, in a related boat, at opposite sides of and spaced from the V-Drive.

The brackets 61 have laterally inwardly projecting and inwardly opening cylindrical bores 65 with bushing sleeves 66 in which the outer ends of the trunions are slidably and rotatably engaged.

The axes of the trunions are normal to and intersect the central longitudinal axis of one of the shafts I or 0 of the V-drive. In the preferred carrying out of the invention and as shown in the drawings, the axes of the trunions intersect the axis of the shaft 0.

With the means M provided, it will be apparent that the transmission can be rotated about the axes of the trunions to effect exact and proper alignment of the shaft O with the propeller shaft with which it is connected and that subsequent alignment of the drive shaft of the engine with the shaft I can be effected by adjustment of the position of the engine.

In practice, the engine drive shaft and V-Drive input shaft I are connected by an intermediate axially extensible splined sub 90 with universal joints 91 at its opposite ends. In such a case, the mounting means M effects the self-alignment of the V-Drive with the propeller shaft and any misalignment of the engine shaft with the Shaft I is compensated for by the sub 90 and joint 91.

In operation, should the propeller shaft, as a result of applied forces, yield out of alignment with the shaft O, in a vertical plane, the V-Drive is capable of turning sufficiently to compensate for such yielding misalignment and to thereby materially reduce adverse effects the applied forces might otherwise have on the V-Drive.

The means M is such that it can also allow or permit limited, lateral shifting of the V-Drive to compensate for lateral deflection of the forward end of the propeller shaft.

It will be noted that with the mounting means M provided, mounting of the V-Drive transmission is materially simplified and the mount is far more versatile and dependable than the mounting means provided by the prior art and which involve flat, rigid mounting flanges on the V-Drives and which are adapted to be secured directly to other adjacent, rigid specially provided mounting parts in the boats in which they are used.

Having described only typical preferred forms and applications of my invention, I do not wish to be limited or restricted to the specific details herein set forth, but wish to reserve to myself any modifications and/or variations that may appear to those skilled in the art to which this invention pertains.

Having described my invention, I claim:

1. A transmission including a housing defining a vertical chamber with an oil sump at its lower end, a shaft in the chamber above the sump, bearing means carried by the housing and rotatably supporting the shaft, said bearing means engaged in a socket in a wall of the housing, opening toward the chamber and through which the shaft freely projects, said bearing means including axially aligned inner and outer annular roller bearing assemblies each with primary and secondary ends, inner and outer race rings, and an annular series of rollers between the races on axes diverging axially and radially outwardly toward said secondary end of the assembly; the bearing assemblies are arranged with their secondary ends in opposed relationship with their outer races engaged in the socket and with their inner races engaged about the shaft, means within the chamber to splash oil from the sump into the upper portion of the chamber and about the shaft, the priary end of the inner bearing assembly communicates with the chamber and lubricating means for the bearing means comprising an oil receiving recess in the bottom of the socket communicating with the primary end of the outer bearing assembly, an elongate oil inlet duct in the housing with an outlet end communicating with the recess and an inlet end communicating with the chamber and an elongate oil outlet duct in the housing with an inlet end communicating with the socket between the bearing assemblies and an outlet end communicating with the chamber below the shaft, said inner races and rollers rotate with the shaft and induce the flow of oil axially and radially outwardly between the races when the shaft is rotated whereby oil splashed into the upper portion of the chamber is caused to flow through the inlet duct into the recess, into and from the primary and secondary ends of the bearing assemblies and thence through the outlet duct and into the chamber.

2. A structure as set forth in claim 1 which includes an oil conducting spacer ring between the opposed primary ends of the outer race rings of the bearing assemblies, said spacer ring having an annular radially outwardly opening groove with which the outlet duct communicates and circumferentially spaced radial ports communicating with the groove and the space radially inward of the spacer ring, and which communicates with the space between the inner and outer races of the bearing assemblies.

3. A structure as set forth in claim 1 wherein the inlet end of the inlet duct is provided with an enlarged cavity opening toward the chamber end in which oil splashed into the upper portion of the chamber is collected for direction into the inlet duct.

4. A structure as set forth in claim 1 which includes an oil conducting spacer ring between the opposed primary ends of the outer race rings of the bearing assemblies, said spacer ring having an annular radially outwardly opening groove with which the outlet duct communicates and circumferentially spaced radial ports communicating with the groove and the space radially inward of the spacer ring, and which communicates with the space between the inner and outer races of the bearing assemblies, the inlet end of the inlet duct is provided with an enlarged cavity opening toward the chamber end in which oil splashed into the upper portionof the chamber is collected for direction into the inlet duct.

5. A structure as set forth in claim 1 wherein said shaft extends through an opening at the recess to the exterior of the housing and said structure includes an annular oil seal in the recess and about the shaft axially outward of the outlet end of the inlet duct.

6. A structure as set forth in claim 1 which includes an oil conducting spacer ring between the opposed primary ends of the outer race rings of the bearing assemblies, said spacer ring having an annular radially outwardly opening groove with which the outlet duct communicates and circumferentially spaced radial ports communicating with the groove and the space radially inward of the spacer ring, and which communicates with the space between the inner and outer races of the bearing assemblies, said shaft extends through an opening at the recess to the exterior of the housing and said structure includes an annular oil seal in the recess and about the shaft axially outward of the outlet end of the inlet duct.

7. A structure as set forth in claim 1 wherein the inlet end of the inlet duct is provided with an enlarged cavity opening toward the chamber end in which oil splashed into the upper portion of the chamber is collected for direction into the inlet duct, said shaft extends through an opening at the recess to the exterior of the housing and said structure includes an annular oil seal in the recess and about the shaft axially outward of the outlet end of the inlet duct.

8. A structure as set forth in claim 1 which includes an oil conducting spacer ring between the opposed primary ends of the outer race rings of the bearing assemblies, said spacer ring having an annular radially outwardly opening groove with which the outlet duct communicates and circumferentially spaced radial ports communicating with the groove and the space radially inward of the spacer ring, and which communicates with the space between the inner and outer races of the bearing assemblies, the inlet end of the inlet duct is provided with an enlarged cavity opening toward the chamber end in which oil splashed into the upper portion of the chamber is collected for direction into the inlet duct, said shaft extends through an opening of the housing and said structure includes an annular oil seal in the recess and about the shaft axially outward of the outlet end of the inlet duct.

9. A V-Drive transmission of the character referred to comprising a housing having front and rear walls, opposite sides, a top, a bottom and defines a vertical chamber with an upper portion and a lower oil sump portion axially aligned front and rear upper openings and axially aligned front and rear lower openings in the front and rear walls, an upper horizontal input shaft extending through the upper openings and a downwardly and rearwardly inclined ouput shaft extending through the lower openings, input and output level gears on the input and output shafts to occur within the chamber and meshed with each other, front anti-friction radial roller bearing means for the forward terminal ends of the shafts engaged about the shafts and in forwardly opening annular front bearing seats in the front wall about the front openings, cover plates secured to the front wall and overlying the front openings and bearing seats, rear radial-thrust anti-friction roller bearing means for the rear portions of the shafts and including rearwardly opening annular rear bearing seats in the rear wall about the rear openings, a pair of roller bearing assemblies with primary and secondary ends engaged in the rear bearing seats with their secondary ends in opposed relationship, each bearing assembly including an inner race ring engaged about its related shaft, an outer race ring engaged in its related bearing seat and an annular row of axially tapered and inclined rollers diverging axially and radially outwardly toward the secondary end of the assembly, retaining plates secured to the rear wall and overlying the upper and lower openings thereon and having apertures through which the rear portions of the shafts freely project, each retaining plate having a forwardly opening annular recess about the apertures therein, an annular oil seal in the recess in each relating plate and engaged about the shaft projecting therethrough, lubricating means to lubricate the upper rear bearing means comprising an elongate oil inlet duct with an inlet end communicating with the chamber above the input shaft and an outlet end communicating with the recess in the retaining plate related to the input shaft forward of the oil seal thereon and an elongate outlet duct with an inlet end communicating with the rear bearing seat related to the upper shaft between the outer races thereof and an outlet end communicating with the chamber below the input shaft, and mounting means to mount the V-Drive to and between laterally spaced engine stingers in a related boat structure.

10. A structure as set forth in claim 9 wherein said mounting means includes a pair of laterally outwardly projecting trunions at the opposite sides of the housing on a horizontal axis normal to the axis of the ouput shaft and mounting plates rotatably engaged on the outer ends of the trunions and fixed to the stingers.

* * * * *